US011323502B2

(12) United States Patent
Rauschenbach et al.

(10) Patent No.: US 11,323,502 B2
(45) Date of Patent: May 3, 2022

(54) TRANSPORT METHOD SELECTION FOR DELIVERY OF SERVER NOTIFICATIONS

(71) Applicant: Nokia Technologies Oy, Espoo (FI)

(72) Inventors: Uwe Rauschenbach, Munich (DE); Thomas Belling, Erding (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/635,527

(22) PCT Filed: Aug. 4, 2017

(86) PCT No.: PCT/US2017/045621
§ 371 (c)(1),
(2) Date: Jan. 30, 2020

(87) PCT Pub. No.: WO2019/027480
PCT Pub. Date: Feb. 7, 2019

(65) Prior Publication Data
US 2020/0267201 A1    Aug. 20, 2020

(51) Int. Cl.
*G06F 15/16* (2006.01)
*H04L 67/02* (2022.01)
(Continued)

(52) U.S. Cl.
CPC .............. *H04L 67/02* (2013.01); *G06F 9/542* (2013.01); *H04L 67/04* (2013.01); *H04L 67/42* (2013.01)

(58) Field of Classification Search
CPC ......... H04L 67/02; H04L 67/04; H04L 67/42; G06F 9/542
See application file for complete search history.

(56) References Cited

U.S. PATENT DOCUMENTS 6,965,917 B1    11/2005 Aloni et al.
8,117,322 B1    2/2012 McQuade
(Continued)

OTHER PUBLICATIONS

European Patent Office, International Search Report and Written Opinion for PCT/US2017/045621, dated May 2, 2018, 11 pages.
(Continued)

*Primary Examiner* — Padma Mundur
(74) *Attorney, Agent, or Firm* — Mintz Levin Cohn Ferris Glovsky and Popeo, P.C.

(57) ABSTRACT

Methods and apparatus, including computer program products, are provided for transport method selection of asynchronous notifications. In some example embodiments, there may be provided a method that includes sending, by a client, a hypertext transfer protocol request for at least one asynchronous notification to be sent by a server to the client, the hypertext transfer protocol request including at least one proposed transport method for carrying the at least one asynchronous notification; determining, by the client, whether a first transport method selected by the server from the at least one proposed transport method is successfully established; and when the determination is that the first transport method is not established successfully, sending, by the client, another hypertext transfer protocol request to the server, the other hypertext transfer protocol request including at least one other proposed transport method. Related systems, methods, and articles of manufacture are also described.

12 Claims, 8 Drawing Sheets

(51) Int. Cl.
*G06F 9/54* (2006.01)
*H04L 67/04* (2022.01)
*H04L 67/01* (2022.01)

(56) References Cited

U.S. PATENT DOCUMENTS

2010/0281108 A1* 11/2010 Cohen .................. H04N 21/458
709/203
2016/0150027 A1* 5/2016 Ding ..................... H04L 67/143
709/227
2019/0004876 A1* 1/2019 Khakimyanov ........ H04L 67/02

OTHER PUBLICATIONS

European Communication under Rule 71(3) EPC for Application No. 17755350.0-1213, dated May 17, 2021, (50 pages).
Berners-Lee, T. et al., "Hypertext Transfer Protocol—HTTP/1.0," Network Working Group, Request for Comments: 1945. May 1996. 60 pages.
Fielding, R. et al., "Hypertext Transfer Protocol (HTTP/1.1): Message Syntax and Routing," Internet Engineering Task Force (IETF), Request for Comments: 7230. Jun. 2014. 89 pages.
Fielding, R. et al., "Hypertext Transfer Protocol (HTTP/1.1): Semantics and Content," Internet Engineering Task Force (IETF), Request for Comments: 7231. Jun. 2014. 101 pages.
Fielding, R. et al., "Hypertext Transfer Protocol (HTTP/1.1): Conditional Requests," Internet Engineering Task Force (IETF), Request for Comments: 7232. Jun. 2014. 28 pages.
Fielding, R. et al., "Hypertext Transfer Protocol (HTTP/1.1): Range Requests," Internet Engineering Task Force (IETF), Request for Comments: 7233. Jun. 2014. 25 pages.
Fielding, R. et al., "Hypertext Transfer Protocol (HTTP/1.1): Caching," Internet Engineering Task Force (IETF), Request for Comments: 7234. Jun. 2014. 43 pages.
Fielding, R. et al., "Hypertext Transfer Protocol (HTTP/1.1): Authentication," Internet Engineering Task Force (IETF), Request for Comments: 7235. Jun. 2014. 19 pages.
Belshe, M. et al., "Hypertext Transfer protocol Version 2 (HTTP/2)," Internet Engineering Task Force (IETF), Request for Comments: 7540. May 2105. 96 pages.
Open Mobile Alliance, "RESTful Network API for Short Messaging," Candidate Version 1.0. Dec. 20, 2011. 101 pages.
Open Mobile Alliance, "RESTful Network API for Notification Channel," Candidate Version 1.0. Dec. 22, 2015. 101 pages.

* cited by examiner

TRANSPORT METHOD SELECTION FOR DELIVERY OF SERVER NOTIFICATIONS

CROSS-REFERENCE TO RELATED APPLICATIONS

This application is a national stage filing of International Application No.: PCT/US2017/045621, filed Aug. 4, 2017, entitled "TRANSPORT METHOD SELECTION FOR DELIVERY OF SERVER NOTIFICATIONS", the contents of which are herein incorporated by reference in their entirety.

FIELD

The subject matter described herein relates to delivery of server notifications, which may comprise asynchronous notifications.

BACKGROUND

The Hypertext Transfer Protocol (HTTP) refers to a request-response protocol commonly used for transport in a client-server framework. HTTP is commonly used across the World Wide Web (WWW). For example, a client application, such as a web browser, may submit an HTTP request message to a server, such as a website coupled to the Internet. In this example, the request to the server may allow the client to get data from the server, post data to the server, delete data stored on the server, and/or perform other actions. The website server may return to the client application a response including a completion status of the client's request, content requested by the client, and/or the like. HTTP may be in accordance with one or more standards, such as Internet Engineering Task Force (IETF), Request For Comments (RFC) 1945 (HTTP version 1.0), RFC 7230-7235 (HTTP version 1.1), RFC 7540 (HTTP version 2.0), and/or other standards. In addition to the WWW, HTTP may be used for transport in other applications as well. The Third Generation Partnership Project (3GPP) for example is including in some standards the use of HTTP (see, for example, 3GPPP TS 29.122, "T8 reference point for Northbound APIs").

SUMMARY

Methods and apparatus, including computer program products, are provided for transport method selection of asynchronous notifications.

In some example embodiments, there may be provided a method that includes sending, by a client, a hypertext transfer protocol request for at least one asynchronous notification to be sent by a server to the client, the hypertext transfer protocol request including at least one proposed transport method for carrying the at least one asynchronous notification; determining, by the client, whether a first transport method selected by the server from the at least one proposed transport method is successfully established; and when the determination is that the first transport method is not established successfully, sending, by the client, another hypertext transfer protocol request to the server, the other hypertext transfer protocol request including at least another proposed transport method.

In some variations, one or more of the features disclosed herein including the following features can optionally be included in any feasible combination. The hypertext transfer protocol request may include a callback uniform resource identifier at the client to enable a reverse hypertext transport protocol call back to the client. The hypertext transfer protocol request may include a request for the server to probe, via a test notification message, whether the first transport method is successfully established. The at least one proposed transport method may include a reverse hypertext transfer protocol, a websocket, and/or a long polling. The first transport method may be determined to be successfully established based on at least a message received from the server before a timeout, a test notification received from the server before the timeout, a ping received from the server before the timeout, a message received from the server carrying a websocket uniform resource identifier at the server, and/or a reply to a ping sent by the client received from the server before timeout. The client may receive the at least one asynchronous notification carried via the first transport method, when the determination is that the first transport method is established successfully. The first transport method selected by the server may be received by the client in a reply to the hypertext transfer protocol request and is indicated by an explicit parameter. The reply may include a websocket uniform resource identifier. The reply may include a hypertext transfer protocol uniform resource identifier for use with long polling. The at least one proposed transport method may be indicated in the hypertext transfer protocol request by the explicit parameter. The request may include a callback uniform resource identifier. The first transport method may include the reverse hypertext transfer protocol. The other transport method may include the websocket. The long polling may represent a default transport method when the first transport method and the other transport method are not successfully established. The client and the server may use the hypertext transfer protocol for transport of other types of data.

In some example embodiments, there may be provided a method that includes receiving, by a server, a hypertext transfer protocol request for the server to send at least one asynchronous notification, the hypertext transfer protocol request including at least one proposed transport method for carrying the at least one asynchronous notification; sending, by the server, an indication of whether a first transport method selected by the server from the at least one proposed transport method is accepted for establishment; sending, by the server, a message to probe establishment of the first transport method; and receiving, by the server, another hypertext transfer protocol request including at least another proposed transport method, when the first transport is not accepted for establishment and/or not successfully established.

In some variations, one or more of the features disclosed herein including the following features can optionally be included in any feasible combination. The hypertext transfer protocol request may include a callback uniform resource identifier at the client to enable a reverse hypertext transport protocol call back to the client. The hypertext transfer protocol request may include a request for the server to probe establishment via a test notification message. The indication may include a message sent to the client before a timeout, a test notification sent to the client before the timeout, a ping sent to the client before the timeout. The message may include a uniform resource identifier at the server. The server may send the at least one asynchronous notification carried via the first transport method, when the first transport is accepted for establishment by the server and/or successfully established. The first transport method selected by the server may be received by the client in a reply to the hypertext transfer protocol request and is indicated by an explicit parameter. The reply may include a websocket uniform resource identifier. The reply may includea hypertext transfer protocol uniform resource identifier for use with long polling. The at least one proposed transport method may be indicated in the hypertext transfer protocol request by the explicit parameter. The request may includea callback uniform resource identifier. The first transport method may include the reverse hypertext transfer protocol. The other transport method may include the websocket. The long polling may represent a default transport method when the first transport method and the other transport method are not successfully established. The client and the server may use the hypertext transfer protocol for transport of other types of data.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1A:
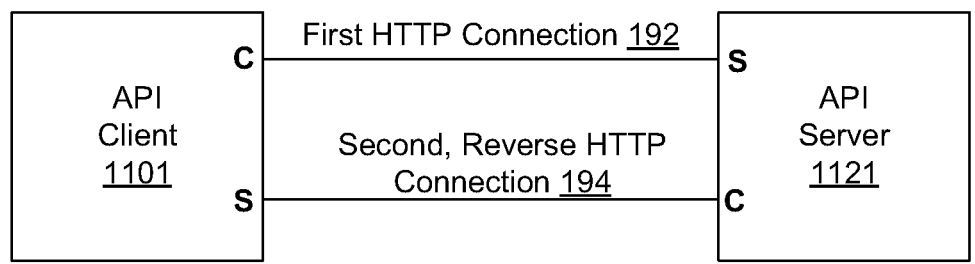
FIG. 1A depicts an example of client and server, in accordance with some example embodiments.

Like labels are used to refer to same or similar items in the drawings.

DETAILED DESCRIPTION

Many applications have requirements to send asynchronous notification(s) from an application programming interface (API) server to an API client. In HTTP however, the client is typically only allowed to send HTTP requests, while the server is only allowed to respond to the client's request. As such, sending the asynchronous notification by the server in an HTTP framework may be considered problematic. The "asynchronous notification" may refer to a message sent by the server in an unsolicited manner (for example, asynchronously) in the sense that the asynchronous notification message is not in response to the API client's request.

Given the noted asynchronous notification problem, a solution may be to use a so-called "Reverse HTTP" connection method. This Reverse HTTP connection method may include a second, separate HTTP connection with the client and server roles reversed to enable transmission of notifications as HTTP requests sent by the API server to the API client. On this second connection, the API client functions as an HTTP server, while the API server functions as an HTTP client able to send requests such as notifications including asynchronous notifications. On the second connection, if the API client resides behind a firewall, the firewall might block requests sent towards that API client.

FIG. 1A depicts an example of the API client 1101 and API server 1121 including the first HTTP connection 192 and the second, separate HTTP connection 194, which is in reverse in the sense that the server 1121 acts, for connection 194, as an HTTP client ("C") while the client 1101 acts as a HTTP server ("S") for the second connection 194. The client 1101 and/or server 1121 may be implemented on a computer, a tablet, smart phone, and/or other processor-based device. The client 1101 and/or server 1121 may establish the HTTP connections 192 and 194 via one or more networks including the Internet, cellular network(s), and/or the like. Furthermore, the HTTP connections 192 and/or 194 may be established via wired and/or wireless links. To illustrate further, a first computer may include API client 1101 which may establish, via a wired and/or wireless links, HTTP connection 192 to a second computer such as a website server including API server 1121.

Another solution to the noted asynchronous notification problem is the Websocket protocol, which can provide full duplex transport channels via the transport control protocol (TCP). The WebSocket protocol may thus provide a way for the server to send content to the client asynchronously (for example, without being solicited by the client). The Websocket protocol may be in accordance with IETF RFC 6455, "The WebSocket Protocol, November 2011."

With the Websocket protocol according to RFC 6455, HTTP is used initially as part of the client-server handshake to setup the transport connection(s), and after this setup, the subsequent transfer are converted to full-duplex WebSocket transport performed in accordance with the Websocket protocol (so certain HTTP features such as framing and the like may not be available after the conversion). The Websocket protocol does, however, work through most modern firewalls configured to allow traversal by HTTP (which assumes the firewalls also allow the upgrade of the HTTP connection to Websocket).

Another solution to the noted asynchronous notification problem is "Long Polling" based on the HTTP protocol (see, for example, RFC 6202, "Known Issues and Best Practices for the Use of Long Polling and Streaming in Bidirectional HTTP," April 2011). In HTTP transport, the server may not initiate a connection to the client or send an unrequested HTTP response to a client, so the server cannot send asynchronous notifications to the client. With Long Polling, the server attempts to hold open (for example, not immediately reply to) each HTTP request, so the server may respond to the client when there are events to deliver. As such, the server has a pending client request to which the server can reply for the purpose of delivering events, such as the notifications/asynchronous notifications as they occur.

Long polling may work through most firewalls that can be traversed by HTTP, and Long Polling may not require the development of extra framing and/or the like as is the case with the Websocket protocol. However, Long Polling may be considered to have lower performance, when compared to the Websocket protocol or the Reverse HTTP method.

The three above-noted solutions to the asynchronous notification problem make clear that there is no one-size-fits-all solution. In some example embodiments, there is provided a way to select via a negotiation which transport mechanism is to be used between a client and a server. In some example embodiments, there may be provided a way to select via a negotiation from among a plurality of HTTP transport methods. In some example embodiments, the plurality of HTTP transport methods may include the Reverse HTTP method, the Websocket method, and/or the Long Polling method. The selected method may, in accordance with some example embodiments, be probed to determine whether the selected method can be implemented successfully (for example, be established and/or operate through a firewall). In some example embodiments, the selected transport method may be used by the server to send notifications including asynchronous notifications to the client, however, HTTP may be continued to be used for other types of transport.

If a client, such as an API client, needs to receive asynchronous notifications from a server, such as an API server, the client may send a request, such as a message, to the server to indicate to the server to send the notifications, such as asynchronous notifications. Within that request, the client may indicate to the server which transport method(s) are supported or allowed by the client for the server's notifications, such as the asynchronous notifications, in accordance with some example embodiments.

In some example embodiments, the client may send a request proposing, as part of a negotiation, to the server a single transport method, such as the Reverse HTTP connection method. If this single transport method is accepted by the server and/or setup/established successfully, the server may begin sending notifications, such as the asynchronous notifications, to the client via the selected transport method in accordance with some example embodiments. If this single transport method is not accepted by the server and/or setup/establishment is unsuccessful, the client may propose, as part of the negotiation, another transport request, in accordance with some example embodiments. To illustrate, if the client requests the server to use the Reverse HTTP for asynchronous notifications but the server does not support the proposed Reverse HTTP, the server may reject the request.

In some example embodiments, the client may send a request proposing, as part of a negotiation, to the server a plurality of transport methods. When this is the case, the server may respond with an indication of the selected transport method. If the selected transport method can be setup/established successfully, the server may begin sending notifications, such as the asynchronous notifications, to the client via the selected transport method, in accordance with some example embodiments. If the selected transport method is not setup/established successfully, another transport request may be proposed and/or selected for use by the server, in accordance with some example embodiments.

Furthermore, when the client sends a request proposing, as part of a negotiation, to the server a plurality of transport methods for example, the server may select one of the transport methods, and may respond to the client with the selected transport method. Alternatively or additionally, the client may send a request proposing, as part of a negotiation, to the server a single transport method for example, the server may accept that transport method, and may respond to the client with the selected transport method. Subsequently, the server and client may exchange messages via the selected (for example, accepted) transport method to probe the viability of the selected transport method. If the probing is successful, the client and the server may use the negotiated transport method for delivery of notifications including asynchronous notifications from the server. If the probing fails however (for example, due to not being able to traverse a firewall or for other reasons), the client may send another request message proposing, as part of a negotiation, to the server another transport method, in which case the probing for viability is repeated until a viable transport method is selected. If the probing for a transport method fails (for example, Reverse HTTP), the client may send a request to the server proposing another transport method (for example, Websocket). If the server accepts the other transport method, probing may be performed once again to determine the viability of the selected transport method. This process may be repeated until a transport method is accepted, and is considered viable for use via the probing.

In some example embodiments, the client, such as the API client, may initially offer a transport method, such as Reverse HTTP. If probing of the selected transport method fails (for example, is not accepted, is rejected or no connection can be established due to blocking by a firewall), the API client may offer another transport method, such as the Websocket method or the Long Polling method. During the setup and establishment of the Websocket transport or the Long Polling transport, a firewall may cause a failure, for example. Although the likelihood of Reverse HTTP failing is higher, when compared to Websocket or Long Polling, the Reverse HTTP may be proposed initially by the API client to the API server before the other two methods as Reverse HTTP may be considered the simplest or most efficient of the three transport methods to implement.

Although some of the examples refer to Reverse HTTP being proposed first in the negotiation between the API client and API server, other methods may be proposed first. Furthermore, although some of the examples refer to selection among Reverse HTTP, Websocket, and Long Polling, the selection may include other transport methods as well including HTTP streaming and/or the like. Moreover, fewer or greater than 3 transport methods may be among the selection pool of transport methods as well.

In Reverse HTTP, the API client may provide to the API server a callback uniform resource identifier (URI). This callback URI may identify to the server an IP address and/or resources at the API client, although the URI may identify another node to which the API server should perform the callback for notification messages. The API server may establish an HTTP connection towards the callback URI before sending an initial asynchronous notification to the API client. The API client's callback URI provisioning at the API server may also indicate that the API client supports receiving separate HTTP connections via Reverse HTTP.

The sending of the notification from the API server to the API client may fail, as noted, due to the firewall (or failure to establish the Reverse HTTP connection, and or for other reasons). In some example embodiments, probing may be used to test the ability of the HTTP connections to successfully traverse firewalls (if present). The following illustrates two examples of probing techniques, in accordance with some example embodiments.

The first probing technique may include sending a test notification. For example, the application framework (which is provided by the API server and accessed by the API client) may define a test notification message which can be used for probing, in accordance with some example embodiments. The API server may send the test notification message to the callback URI provided by the API client. In some example embodiments, the API client may request a test notification in the same message carrying the callback URI to the API server, although the request for the test notification message may be carried or signaled to the API server in other ways as well. If the API client receives the server's test notification before a timeout (for example, the expiration of a timer), the API client knows that Reverse HTTP works successfully.

When the callback URI points to another node (for example, a node separate from the API client), the other node may inform the API client of receipt of the test notification sent by the API server. If the API client is informed about the reception of the test notification from the other node before a timeout, the API client knows that Reverse HTTP method works successfully.

If the API server receives, before a timeout expiry, a confirmation of the test notification being received at the URI callback location (for example, at the API client or the separate node), the API server knows that Reverse HTTP transport works successfully, in which case the API server can start using the Reverse HTTP for sending notification messages including asynchronous notifications to the API client, in accordance with some example embodiments.

A second probing technique may also be implemented in accordance with some example embodiments. In the second probing technique, the API server may send an HTTP GET (or other request type such as HEAD, empty POST, and/or the like) request to the callback URI. If the API client receives the API server's HTTP GET request before a timeout expires, the API client knows that the Reverse HTTP is successfully working. If the API server receives an HTTP success response before the timeout expiry, the probing may be considered successful, in which case the API server can start using the Reverse HTTP transport method for sending notification messages including asynchronous notifications to the API client, in accordance with some example embodiments. The client and server may continue to use HTTP for other types of data transport.

Some of the examples herein refer to a timeout. The timeout may be implemented as a timer. The value of the timeout may be configured at the API client and/or the API server. Alternatively or additionally, the timeout value(s) may be negotiated via a message exchange between API client and the API server. For example, the API client may send to the API server a message including the callback URI and a proposed timeout value (which can be accepted by the API server, or modified as part of a negotiation).

When the API client supports receiving from the API server notifications/asynchronous notifications via the Websocket transport method, the API client may indicate Websocket support in the initial HTTP request message sent to the API server, in accordance with some example embodiments. In response to the initial request message, the API server may respond to the API client with a Websocket URI (which may further include, in accordance with the Websocket protocol, "ws" or "wss", a hostname, an optional port, and/or an optional path). The API server's response (which may include the Websocket URI) may indicate that the API server selects, as part of the negotiation, the Websocket transport method.

Upon receiving this Websocket URI, the API client may establish a separate HTTP connection towards the Websocket URI. Next, the API client may use the HTTP upgrade mechanism to convert the HTTP connection to a Websocket connection in accordance with IETF RFC 6455. Alternatively or additionally, the API client may, upon receiving the Websocket URI, request another node to setup an HTTP connection towards that Websocket URI, in which case the other node may use the HTTP upgrade mechanism to convert that HTTP connection to a Websocket connection in accordance with IETF RFC 6455.

As noted, the setup of a Websocket connection may fail due to a firewall. To probe whether a firewall may cause a failure with respect to using the selected Websocket transport method, probing may be performed, in accordance with some example embodiments.

A way to probe the Websocket connectivity may be to assess the establishment of the Websocket itself. If the Websocket connection is successfully established using the procedure in RFC 6455 before a timeout occurs, then the probe may be considered successful. Due to the design of the Websocket protocol, this can be determined at both client and server. If the API client requests another node to setup the Websocket connection, the other node may inform the API client when the setup of the Websocket connection is complete. If the API client is informed about the completion of the Websocket connection setup before a timeout occurs, the API client may know that the Websocket transport is successfully working.

Another way to probe the Websocket connectivity is using a test notification. For example, if the application framework implements a test notification message, the API server may send the test notification message to probe the Websocket connectivity after the establishment of the Websocket connection. In some example embodiments, the API client may request the API server to use the test notification message in the same message requesting the use of Websocket. If the API client receives the test notification before a timeout occurs, the API client knows that Websocket is successfully working. If the API client requested another node to setup the Websocket connection, the other node may inform the API client when the test notification is received. If the API client is informed about the reception of the test notification before a timeout occurs, the API client knows that Websocket is successfully working. If the API server receives the confirmation of the test notification before a timeout occurs, the API server knows that Websocket is successfully working, in which case the API server can start using the Reverse HTTP method for sending notification messages including asynchronous notifications to the API client, in accordance with some example embodiments.

Yet another way to test the Websocket is using a ping-pong procedure according to IETF RFC 6455 after the establishment of the Websocket connection. If the ping-pong procedure is completed, the initiator of the procedure (which can be either the API client or the API server) knows that Websocket is working bi-directionally, and the initiator may use the Websocket method. If the API client requested another node to set up the Websocket connection, the other node may initiate the ping-pong procedure. The other node may inform the API client when the ping-pong procedure has been completed. If the API client is informed about the completion of the ping-pong procedure before a timeout occurs, the API client knows that Websocket is successfully working. If a timeout occurs but the API client has not been informed about the completion of the ping-pong procedure, the API client may offer another transport method to the API server.

In some example embodiments, the Long Polling method may be considered a universal fallback in the sense that the Long Polling transport method may be selected, or negotiated, for use between the API client and API server if the Reverse HTTP method and the Websocket method noted above cannot be used (for example, if establishment of the transport or probing is unsuccessful).

If the API client supports using Long Polling for notifications such as asynchronous notifications from the API server, the API client may send to the API server a request to setup the Long Polling, in accordance with some example embodiments. When the API client requests from the API server the establishment of the Long Polling for notification delivery, the API server may include a Long Polling URI in the response to the request. This Long Polling URI may indicate from which URI the API client can subsequently fetch notifications including asynchronous notifications via Long Polling. The inclusion of the Long Polling URI in the response from the API server may also indicate to the API client that the API server selects the Long Polling method for use. The API client may, when it receives this Long Polling URI, establish a separate HTTP connection towards the Long Polling URI at the server, and the API client may then send the first Long Poll request to Long Polling URI at the API server. Alternatively or additionally, upon receiving this Long Polling URI, the API client may request that another node establish an HTTP connection towards the Long Polling URI, and this other node may send the first Long Poll request to the API server.

The Long Polling connectivity may be probed by sending a test notification message. If the application framework supports the use of a test notification message for probing, the API server may send a test notification message through the Long Polling connection after receiving the first poll request from the API client. The API client may request the use of the test notification in the initial request message sent to the API server proposing the use of Long Polling. If the API server receives the poll request (which in this example is a test notification) before a timeout occurs, the API server may know that Long Polling is successfully working, in which case the API server may start using the Long Polling for notifications including asynchronous notifications to the API client. If the API client receives that test notification before a timeout occurs, the API client may know that Long Polling is successfully working. If the API client requested another node to set up the Long Polling connection, the other node may inform the API client that the notification has been received by the other node before a timeout occurs, in which case the API client knows that Long Polling is successfully working.

Although the previous example refers to probing of the Long Polling, in some example embodiments, probing the Long Polling connection may be omitted as the likelihood for a successful Long Polling connection establishment (even through firewalls) is very high, when compared to other transport methods.

Figure 1B:
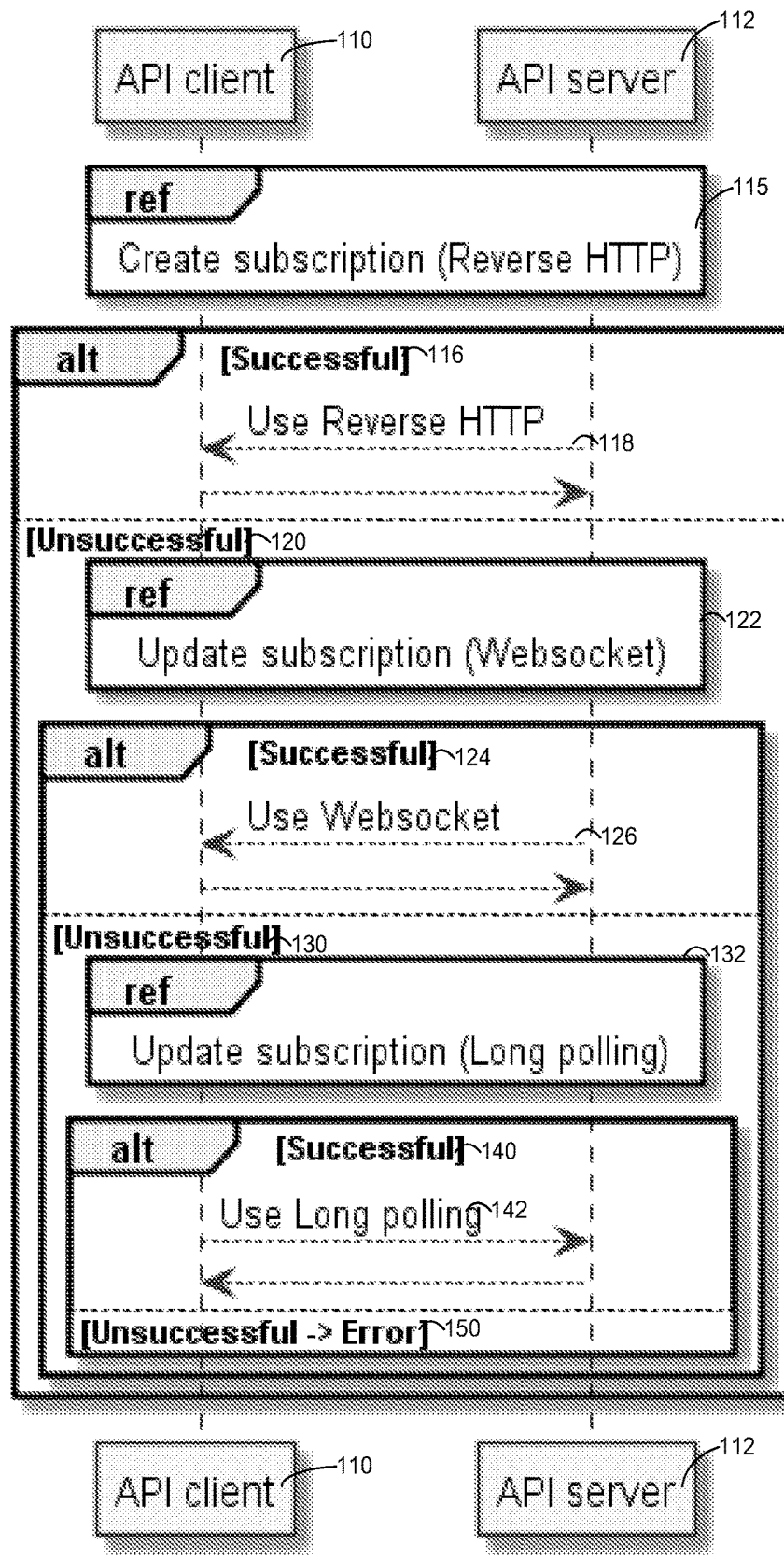
FIG. 1B depicts an example of a process for negotiating a transport method for server notification, in accordance with some example embodiments.

FIG. 1B depicts an example of a process 100 for selecting a transport method for server notification sent asynchronously to a client, in accordance with some example embodiments.

At 115, a subscription may be created to indicate that Reverse HTTP can be used for transport on a connection between the API client 110 and the API server 112 to enable server notification messages, such as asynchronous notification messages, in accordance with some example embodiments. The API client 110 may propose the Reverse HTTP transport method for a connection to carry only notifications, such as asynchronous notifications, sent by the API server to the API client, so that other types of transport between the client 110 and server 112 may remain in accordance with HTTP, for example. The subscription refers to a data record defining the intent of a client to be informed about events at a server, so the subscription may define the events for which the client would like to receive notifications, such as asynchronous notifications, from the server. For example, the subscription may restrict the scope to specific events (for example, by defining filters only matched by these specific events) or may apply to all notifications a server can emit to the client. The subscription may also include information related to the delivery of the notifications, such as transport methods, parameters such as URI, probing technique to be used, and/or the like. Moreover, the subscription may include information about how long the subscription is valid.

If the proposed use of Reverse HTTP is accepted by the API server 112 and/or probing indicates that the Reverse HTTP is working successfully at 116, the API server may use, at 118, Reverse HTTP for asynchronous notifications sent by the API server to the API client. The API client may continue to use HTTP, rather than Reverse HTTP, for other types of data transfers to the API server.

If the negotiation proposing use of Reverse HTTP is unsuccessful at 120 (for example, not accepted by the API server 112 and/or probing indicates that the Reverse HTTP is not working successfully due to for example a firewall), the API client 110 may propose, at 122, the Websocket transport method for a connection carrying notifications sent by the API server to the API client. This proposal may take the form of a subscription update.

If the proposed use of the Websocket transport method is accepted by the API server 112 and/or probing indicates that the Websocket is working successfully at 124, the API server may use, at 126, the Websocket transport for asynchronous notifications sent by the API server to the API client. The API client and server may continue to use HTTP, rather than Websocket, for other types of data transports.

If the proposed use of the Websocket method is unsuccessful at 130 (for example, not accepted by the API server and/or probing indicates that the Websocket is not working successfully due to for example a firewall), the API client 110 may propose, at 132, the Long Polling transport method for a connection carrying asynchronous notifications sent by the API server to the API client.

If the proposed use of the Long Polling method is accepted by the API server and/or probing indicates that the Long Polling is working successfully at 140, the API server 112 may use, at 142, the Long Polling transport method for notifications provided by the API server to the API client. The API client and/or API server may continue to use HTTP, rather than Long Polling, for other types of data transport.

If the proposed use of the Long Polling is unsuccessful at 150 (for example, not accepted by the API server and/or probing indicates that the Long Polling is not working successfully due to for example a firewall), an error may be generated.

Figure 2:
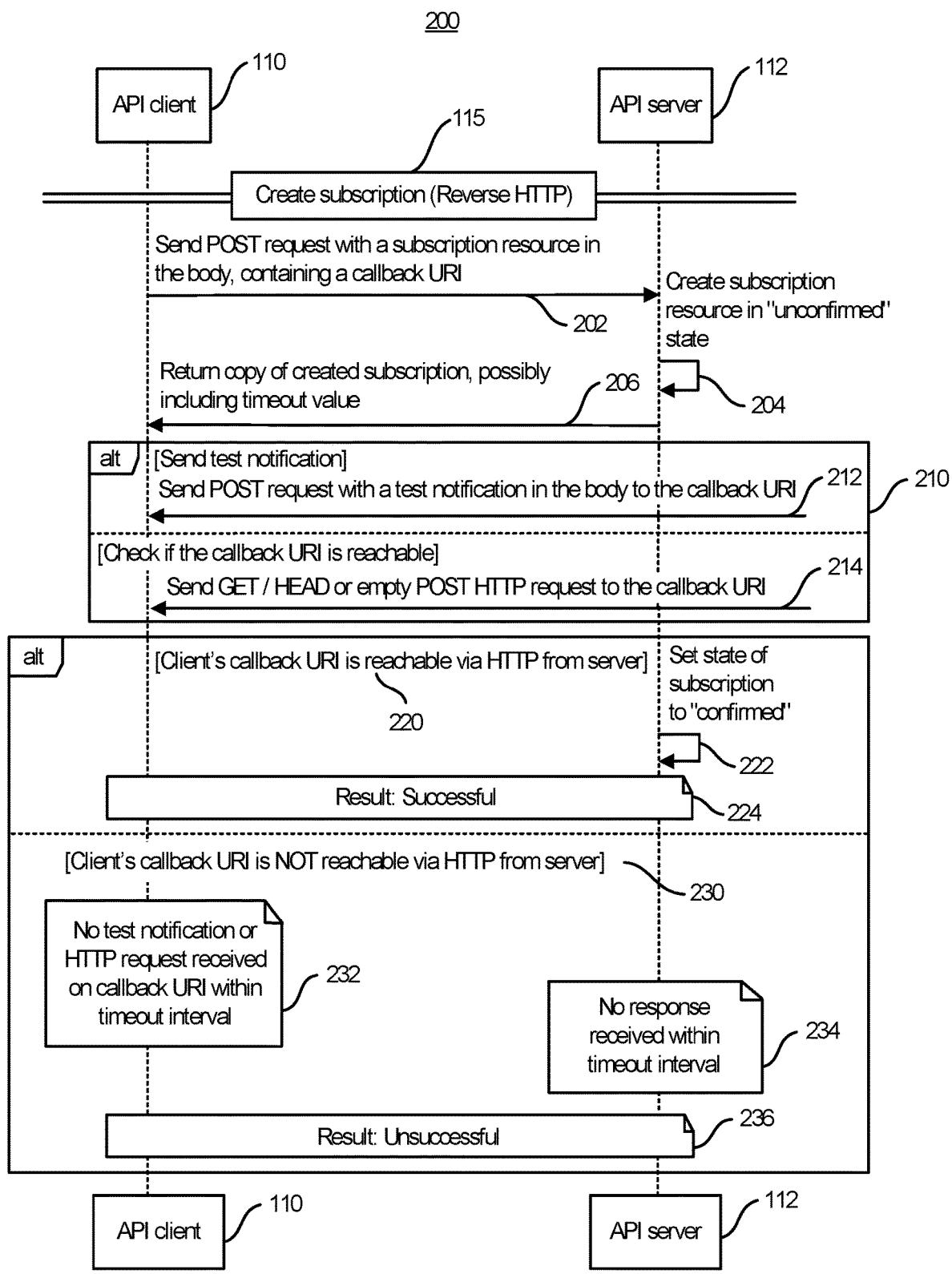
FIG. 2 depicts an example of a process for creating the Reverse HTTP transport method for server notifications sent asynchronously to a client, in accordance with some example embodiments.

FIG. 2 depicts an example process 200 for creating the Reverse HTTP transport method subscription for a connection carrying notifications such as asynchronous notifications from the server 112 to the client 110, in accordance with some example embodiments.

At 202, the API client 110 may send an HTTP request, such as a POST, to the API server 112, and this HTTP request may include a subscription resource (subscription data set) including the callback URI, in accordance with some example embodiments. In response to receiving the HTTP request including the callback URI, the API server 112 may create, at 204, a subscription resource in an "unconfirmed" state, in accordance with some example embodiments. The API server may send, at 206, a copy of the created subscription, including data such as the call back URI and/or a timeout value, in accordance with some example embodiments.

At 210, probing of the Reverse HTTP may be performed by the API server 112, in accordance with some example embodiments. To that end, the API server 112 may send, at 212, an HTTP POST request including the test notification to the callback URI, in accordance with some example embodiments. The API server 112 may also check whether the callback URI is reachable at 214 by sending an HTTP GET (or HEAD, POST, and/or the like) to the callback URI, in accordance with some example embodiments. The probing and/or the reachability check may indicate whether the Reverse HTTP transport can be successfully used between the API server 112 and the API client 110.

If the API client's 110 callback URI is reachable by the API server 112 via HTTP (220), the API server may set, at 222, the state of the subscription to "confirmed" and begin using, at 224, the Reverse HTTP method for notifications, such as asynchronous notifications sent by the API server to the API client. The API client and/or API server may continue to use HTTP, rather than Reverse HTTP, for other types of data transport.

If the API client's 110 callback URI is not reachable by the API server 112 via HTTP (230), the result may be considered unsuccessful (236), so the API client may propose another transport method, in accordance with some example embodiments. If the API client 110 does not receive a test notification and/or receive an HTTP request to the callback URI within a timeout (232), the API client may consider the use of Reverse HTTP as unsuccessful at 236, in accordance with some example embodiments. Alternatively or additionally, if the API server 112 does not receive a response to the test notification and/or a response to the HTTP request to the callback URI (234), the API server 123 may consider the use of Reverse HTTP as unsuccessful at 236, in accordance with some example embodiments.

Figure 3:
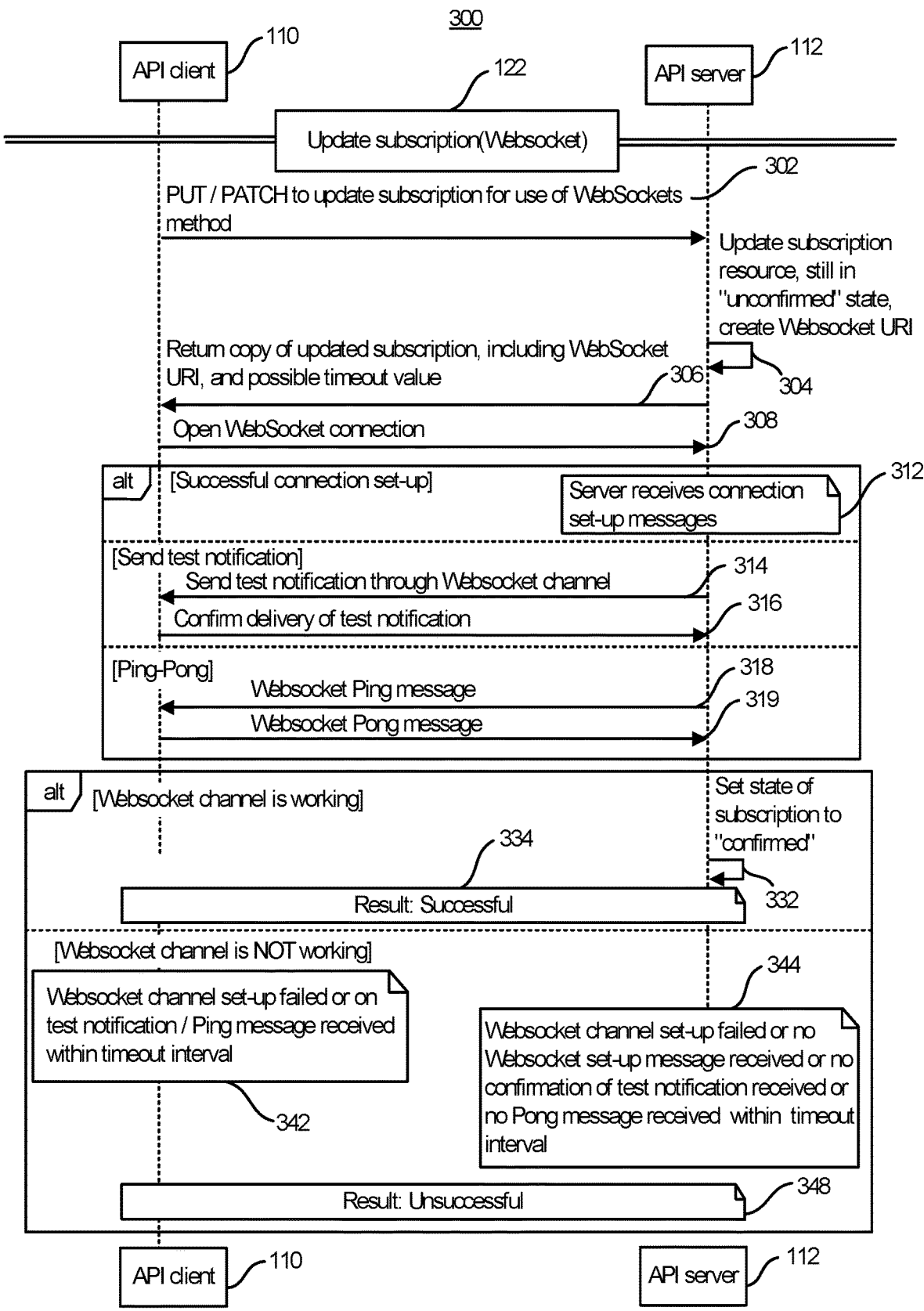
FIG. 3 depicts an example of a process for creating the Websocket transport for server notifications sent asynchronously to a client, in accordance with some example embodiments.

FIG. 3 depicts an example process 300 for updating a subscription 122 to propose Websocket transport for server notifications sent asynchronously to a client, in accordance with some example embodiments.

At 302, the API client 110 may send an HTTP request such as a PUT, PATCH, and/or the like including an indication that the subscription should be updated to the Websocket transport method, in accordance with some example embodiments. The request sent at 302 may indicate to the API server 112 that the API client 110 supports, as part of a negotiation with the API server, Websocket transport. At 304, the API server 112 may update the subscription to show the Websocket subscription as "unconfirmed," and may create a Websocket URI, in accordance with some example embodiments. At 306, the API server 112 may return to the API client 110 a copy of the updated subscription including the Websocket URI and/or a timeout value, in accordance with some example embodiments. At 308, a Websocket connection is opened to the Websocket URI for purposes of handling notifications such as the asynchronous notifications from the server 112 to the client 110, in accordance with some example embodiments.

At 312, if the API server 112 successfully receives the Websocket connection setup messages, then the API server 112 may consider the Websocket connection to be successful. However further probing at 314/316 and/or 318/319 may be needed as well to confirm operation. To probe, the API server 112 may send, at 314, a test notification message to the API client 110. If the API client 110 confirms receipt of the test notification message by, for example, sending message 316 before the timeout value, the API server 112 may consider the Websocket connection to be successful. Alternatively or additionally, the API server 112 may, at 318, send a ping message to the API client 110. If the API client 110 confirms receipt of the ping message by, for example, sending a message such as pong 319 before the timeout value, the API server 112 may consider the Websocket connection to be successful.

If the Websocket connection is considered successfully established, the API server may, at 332, update the state of the subscription to "confirmed" and begin using, at 334, the Websocket connection for notification, such as asynchronous notifications sent by the API server to the API client. The API client and server may continue to use HTTP, rather than Websocket, for other types of data transports.

At 342 and 344, if the Websocket connection setup messages and/or probing at 314/316 and/or 318/319 failed, the API client 110 and API server 112 may consider the use of Websockets as unsuccessful at 348, in which case another method may be proposed.

Figure 4:
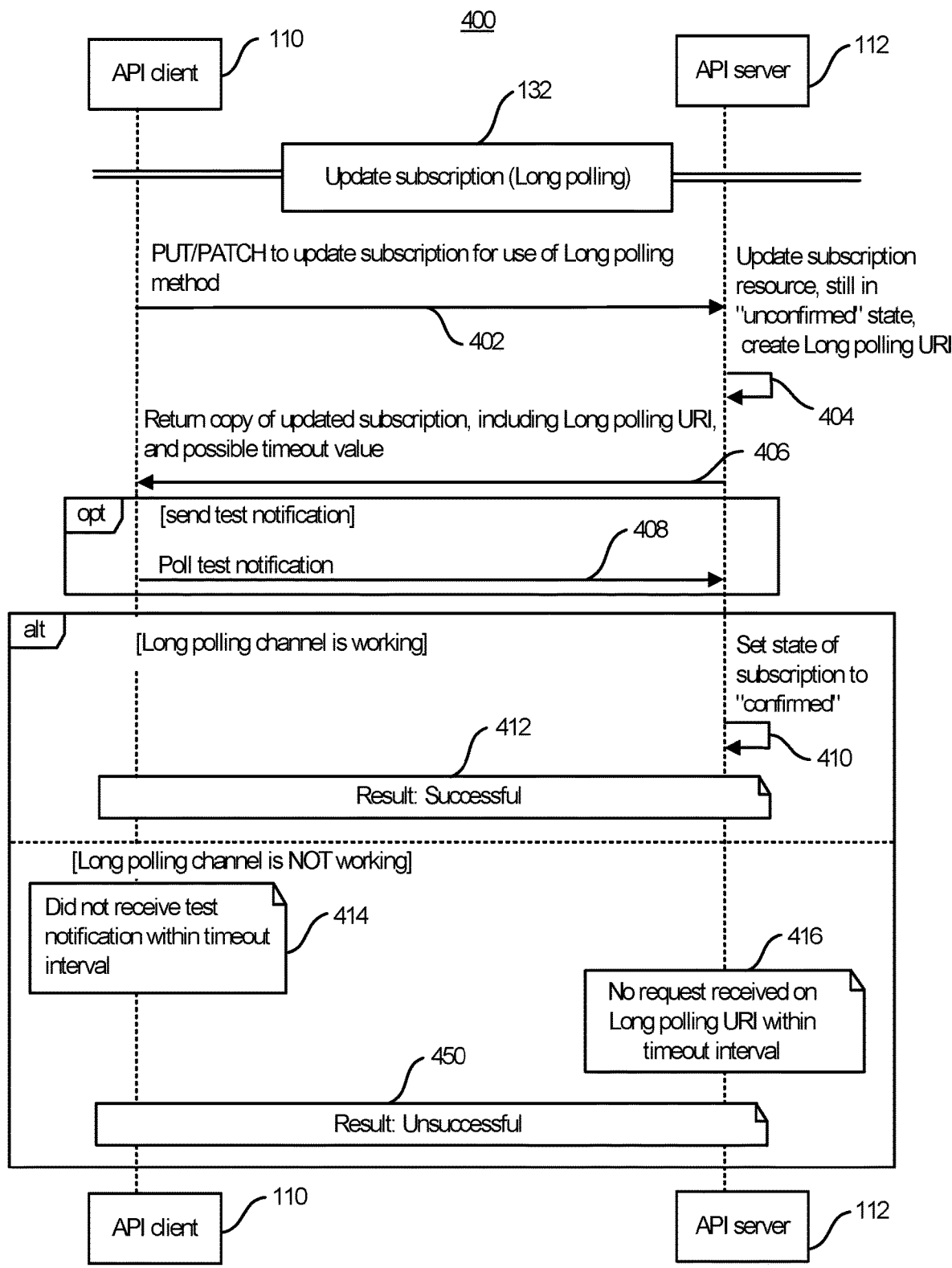
FIG. 4 depicts an example of a process for creating the Long Polling transport for server notifications sent asynchronously to a client, in accordance with some example embodiments.

FIG. 4 depicts an example process 400 for updating a subscription 132 to propose Long Polling transport for server notifications sent asynchronously to a client, in accordance with some example embodiments.

At 402, the API client 110 may send to the API server 112 an HTTP request such as a PUT, PATCH, and/or the like including an indication that the subscription should be updated to Long Polling transport methods, in accordance with some example embodiments. The request sent at 402 may indicate to the API server 112 that the API client supports the Long Polling transport method and proposes, as part of a negotiation, the use of Long Polling. At 404, the API server 112 may update the subscription to show the Long Polling subscription as "unconfirmed," and may create a Long Polling URI, in accordance with some example embodiments. At 406, the API server 112 may return to the API client 110 a copy of the updated subscription including the Long Polling URI and/or a timeout value, in accordance with some example embodiments.

At 408, the API server 112 may provide a test notification which the API client 110 fetches via Long Polling, in accordance with some example embodiments. If the Long Polling is successful (i.e. the client 110 has fetched the test notification successfully), the API server 112 may, at 410, update the state of the subscription to "confirmed" and begin using, at 412, to use Long Polling transport for notification, such as asynchronous notifications provided by the API server to the API client. The API client and server may continue to use HTTP, rather than Long Polling, for other types of data transports.

If however the Long Polling is not successful (i.e. the test notification was not fetched successfully within a timeout 414/416), the API client 110 and API server 112 may consider the use of Long Polling as unsuccessful at 450, in which case an error may be generated.

Figure 5A:
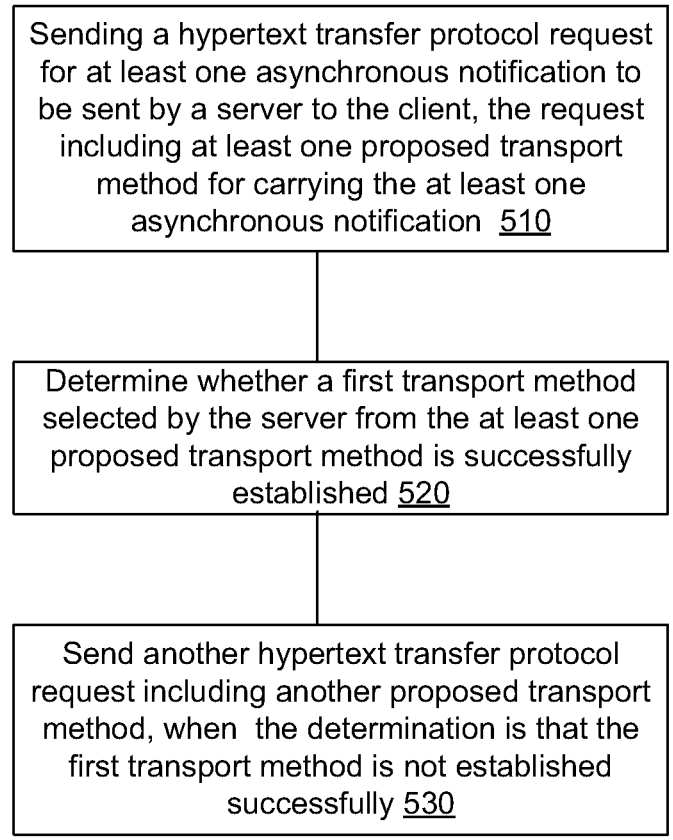
FIGS. 5A-5B depict examples of processes, in accordance with some example embodiments.

FIG. 5A depicts an example process 500, in accordance with some example embodiments.

In some example embodiments, a client, such as client API 110, may request, at 510, asynchronous notification(s) to be sent by server 112 to the client 110, in accordance with some example embodiments. The request may include at least one proposed transport method, such as reverse HTTP, websocket, and/or long polling, for carrying the asynchronous notification(s). As noted, the request may include a set of transport methods, or may include a single transport method. The request may include other parameters, such as a callback URI for reverse HTTP, a request for probing (and/or what type of probing), and/or the like. Further, the request may comprise an HTTP request. Furthermore, the HTTP request may include a callback uniform resource identifier at the client to enable a reverse hypertext transport protocol call back to the client. Alternatively or additionally, the HTTP request may include a request for the server to probe, for example via a test notification message, whether the first transport method is successfully established.

At 520, the client 110 may determine whether a first transport method selected by the server 112 from the at least one proposed transport method is successfully established, in accordance with some example embodiments. For example, the successful establishment of the selected first transport method may be a result of the establishment and/or probing of the first transport method between the client and the server.

At 530, the client 110 may send, in accordance with some example embodiments, to server 112 another hypertext transfer protocol request including at least another proposed transport method, when the determination is that the first transport method is not established successfully. For example, if the first transport method is not established successfully, the client 110 may send another proposal for the transport method to allow the server to select another transport method for carrying the asynchronous notifications.

Figure 5B:
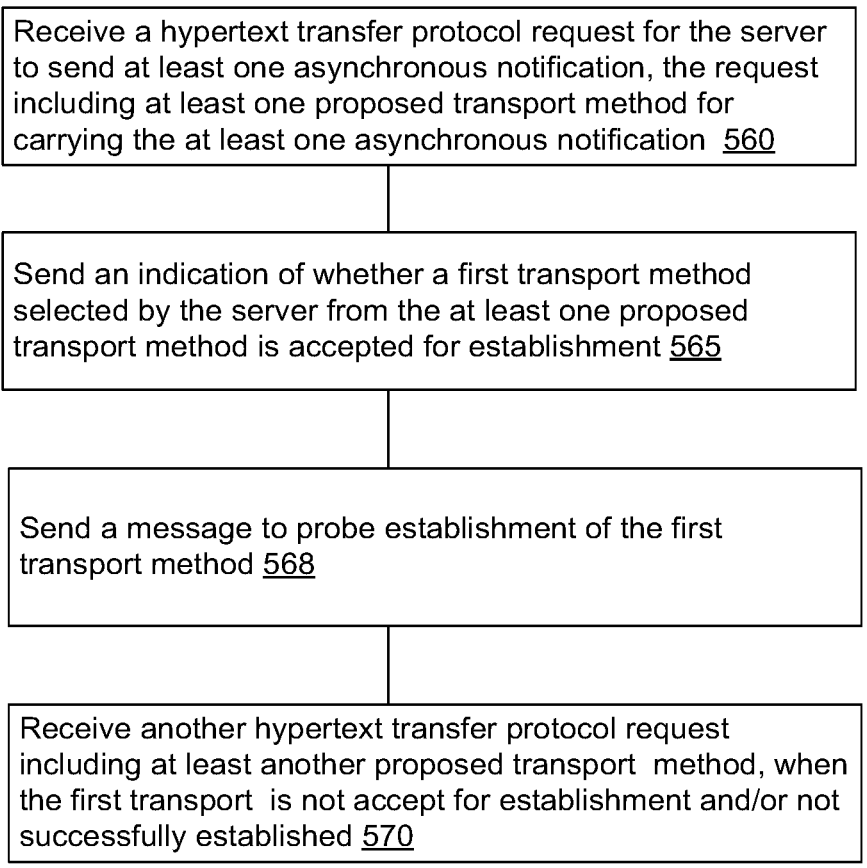

FIG. 5B depicts an example process 599, in accordance with some example embodiments.

At 560, a server, such as server 112, may receive, from the client 110, a hypertext transfer protocol request for the server to send at least one asynchronous notification, in accordance with some example embodiments. The hypertext transfer protocol request may include at least one proposed transport method for carrying the at least one asynchronous notification.

At 565, the server 112 may send to the client an indication of whether a first transport method selected by the server from the at least one proposed transport method is accepted for establishment, in accordance with some example embodiments. For example, the server may, based on its capabilities, select, from the at least one proposed transport method, the first transport method.

At 568, the server 112 may send a message to probe establishment of the first transport method, in accordance with some example embodiments. As noted, the message may probe the first transport method, such as reverse HTTP, websocket, and/or the like. The message may comprise a test notification message, a ping/message, and/or other types of messages, including response messages to a request from the client 110.

In accordance with some example embodiments, the server 112 may, at 570, receive, from the client 110, another hypertext transfer protocol request including at least another proposed transport method, when the first transport is not accepted for establishment and/or not successfully established. As noted, if the client initially proposes Reverse HTTP, the other request to the server 112 may propose Websocket or Long Polling, for example.

Figure 6:
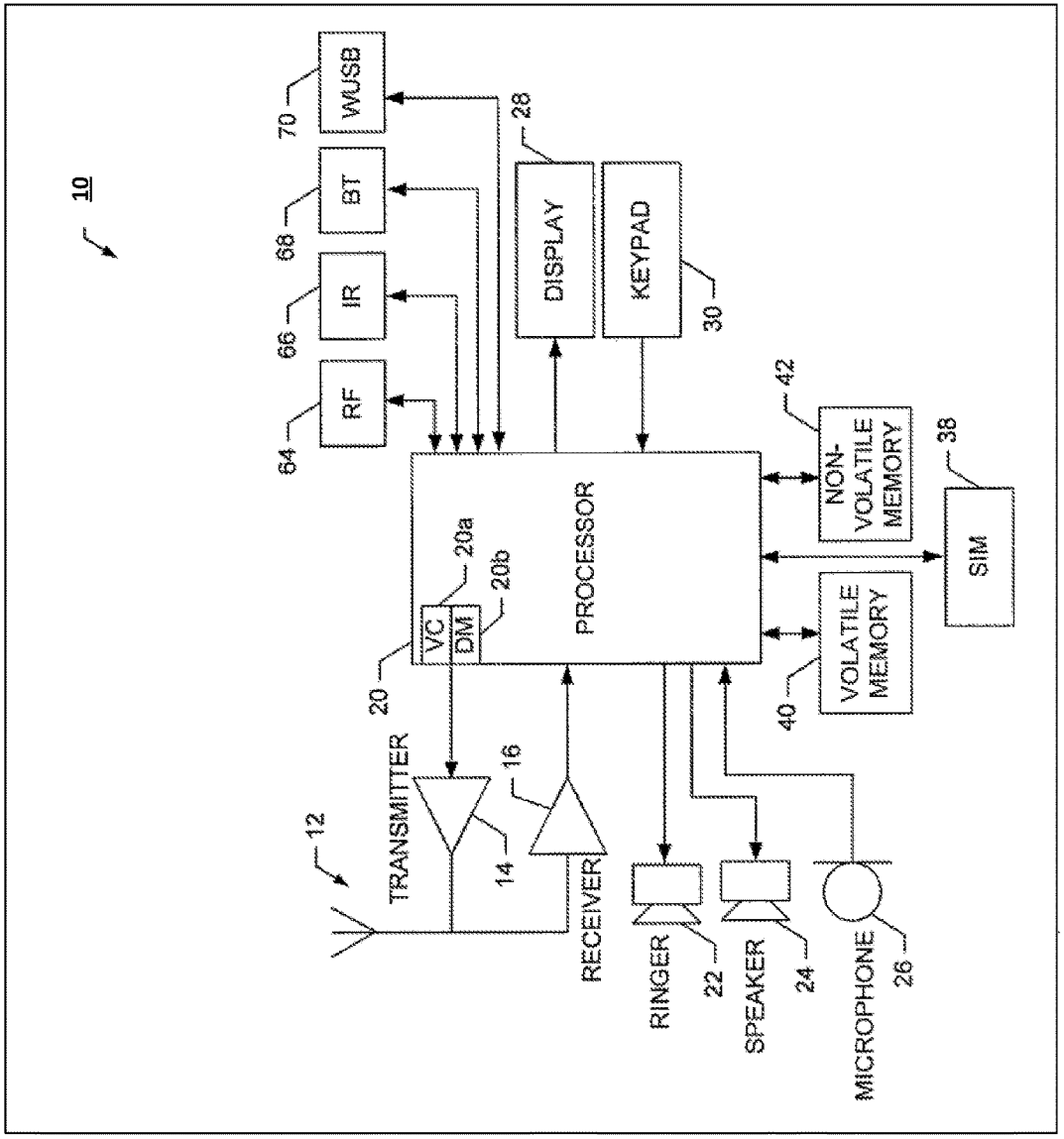
FIG. 6 depicts an example of an apparatus, in accordance with some example embodiments.

FIG. 6 illustrates a block diagram of an apparatus 10, in accordance with some example embodiments.

In some example embodiments, apparatus 10 may provide a processor-based device, such as a computer, tablet, smartphone, cell phone, Internet of Things (IoT) device, a website server, and/or the like. The apparatus may include wired and/or wireless interface to enable the establishment of wired and/or wireless links. For example, a first apparatus 10 may include API client 110, while a second apparatus 10 may include server 112. When this is the case, a transport method may be selected and probed as described herein, in accordance with some example embodiments.

In some example embodiments, the client and/or the server may be implemented at an apparatus, such as apparatus 10. In some example embodiments, the apparatus 10 may be coupled (via wired and/or wireless connection(s)) to the Internet, IP multimedia subsystem (IMS), and/or other nodes and/or networks.

Furthermore, the apparatus 10 may be implemented as a dedicated sensor, IoT sensor, and/or the like. For example, the IoT sensor may be implemented as a traffic camera, a temperature sensor, and/or other type of sensor fixedly attached to a building or traffic light, although the IoT sensor may be mobile as well. In the case of the IoT sensor, the apparatus 10 may include a less powerful processor and/or less memory, when compared to for example a smartphone. Furthermore, the IoT sensor may access the cellular network via another device. For example, the IoT sensor may couple to the cellular network via a first interface, such as Bluetooth or a WiFi, to another apparatus having a second interface to the cellular network.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 6 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, Websockets, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 6, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein including, for example, sending, by a client, a hypertext transfer protocol request for at least one asynchronous notification to be sent by a server to the client, the hypertext transfer protocol request including at least one proposed transport method for carrying the at least one asynchronous notification; determining, by the client, whether a first transport method selected by the server from the at least one proposed transport method is successfully established; and when the determination is that the first transport method is not established successfully, sending, by the client, another hypertext transfer protocol request to the server, the other hypertext transfer protocol request including at least another proposed transport method. Alternatively or additionally, the memories may store one or more software programs, instructions, pieces of information, data, and/or the like which may be used by the apparatus for performing operations disclosed herein including, for example, receiving, by a server, a hypertext transfer protocol request for the server to send at least one asynchronous notification, the hypertext transfer protocol request including at least one proposed transport method for carrying the at least one asynchronous notification; sending, by the server, an indication of whether a first transport method selected by the server from the at least one proposed transport method is accepted for establishment; sending, by the server, a message to probe establishment of the first transport method; and receiving, by the server, another hypertext transfer protocol request including at least another proposed transport method, when the first transport is not accept for establishment and/or not successfully established.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein (see, for example, process 100, 200, 300, 400, 500, 599, and/or other operations disclosed herein). For example, the processor 20 may be configured using computer code stored at memory 40 and/or 42 to at least including, for example, perform one or more of the operations disclosed herein including at process 100, 200, 300, 400, 500, 599, and/or the like.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 6, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be enhanced control of transport method selection for asynchronous server notifications by enabling a negotiation between the client and server for the selection of the transport method.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
   sending, by a client, a hypertext transfer protocol request for at least one asynchronous notification to be sent by a server to the client, the hypertext transfer protocol request including at least one proposed transport method for carrying the at least one asynchronous notification, the at least one proposed transport method comprising a first transport method, the first transport method comprising a separate hypertext transfer connection, the hypertext transfer protocol request including a callback uniform resource identifier at the client to enable the separate hypertext transfer connection, the separate hypertext transfer connection comprising a reverse hypertext transport protocol callback to the client;
   determining, by the client, whether the first transport method comprising the separate hypertext transfer connection is successfully established, the first transport method being selected by the server from the at least one proposed transport method included in the hypertext transfer protocol request; and
when the determination is that the first transport method comprising the separate hypertext transfer connection is not established successfully, sending, by the client, another hypertext transfer protocol request to the server, the other hypertext transfer protocol request including at least one other proposed transport method comprising a websocket.

2. The method of claim 1, wherein the hypertext transfer protocol request includes a request for the server to probe, via a test notification message, whether the first transport method comprising the separate hypertext transfer connection is successfully established.

3. The method of claim 1, wherein the first transport method comprising the separate hypertext transfer connection is determined to be successfully established based on a test notification received before a timeout.

4. The method of claim 1, further comprising:
receiving, by the client, the at least one asynchronous notification carried via the first transport method comprising the separate hypertext transfer connection, when the determination is that the first transport method is established successfully.

5. A method comprising:
receiving, by a server, a hypertext transfer protocol request for the server to send at least one asynchronous notification, the hypertext transfer protocol request including at least one proposed transport method for carrying the at least one asynchronous notification, the at least one proposed transport method comprising a first transport method, the first transport method comprising a separate hypertext transfer connection, the hypertext transfer protocol request including a callback uniform resource identifier at a client to enable the separate hypertext transfer connection, the separate hypertext transfer connection comprising a reverse hypertext transport protocol callback to the client;
sending, by the server, an indication of whether the first transport method comprising the separate hypertext transfer connection selected by the server from the at least one proposed transport method is accepted for establishment;
sending, by the server, a message to probe establishment of the first transport method comprising the separate hypertext transfer connection; and
receiving, by the server, another hypertext transfer protocol request including at least one other proposed transport method comprising a websocket, when the first transport method comprising the separate hypertext transfer connection is not accepted for establishment or not successfully established.

6. The method of claim 5, wherein the indication comprises a reply to the hypertext transfer protocol request accepting or rejecting the request.

7. The method of claim 5, further comprising:
sending, by the server, the at least one asynchronous notification carried via the first transport method, when the first transport is accepted for establishment by the server or successfully established.

8. An apparatus comprising:
at least one processor; and
at least one memory including computer program code, the at least one memory and the computer program code configured to, with the at least one processor, cause the apparatus to at least:

send a hypertext transfer protocol request for at least one asynchronous notification to be sent by a server to the apparatus, the hypertext transfer protocol request including at least one proposed transport method for carrying the at least one asynchronous notification, the at least one proposed transport method comprising a first transport method, the first transport method comprising a separate hypertext transfer connection, the first transport method comprising a separate hypertext transfer connection, the hypertext transfer protocol request including a callback uniform resource identifier at the apparatus to enable the separate hypertext transfer connection, the separate hypertext transfer connection comprising a reverse hypertext transport protocol callback to the apparatus;
determine whether the first transport method comprising the separate hypertext transfer connection is successfully established, the first transport method being selected by the server from the at least one proposed transport method included in the hypertext transfer protocol request; and
when the determination is that the first transport method comprising the separate hypertext transfer connection is not established successfully, send another hypertext transfer protocol request to the server, the other hypertext transfer protocol request including at least one other proposed transport method comprising a websocket.

9. An apparatus comprising:
at least one processor; and
at least one memory including computer program code, the at least one memory and the computer program code configured to, with the at least one processor, cause the apparatus to at least:
receive a hypertext transfer protocol request for the apparatus to send at least one asynchronous notification, the hypertext transfer protocol request including at least one proposed transport method for carrying the at least one asynchronous notification, the at least one proposed transport method comprising a first transport method, the first transport method comprising a separate hypertext transfer connection, the hypertext transfer protocol request including a callback uniform resource identifier at a client to enable the separate hypertext transfer connection, the separate hypertext transfer connection comprising a reverse hypertext transport protocol callback to the client;
send an indication of whether the first transport method comprising the separate hypertext transfer connection selected by the apparatus from the at least one proposed transport method is accepted for establishment;
send a message to probe establishment of the first transport method comprising the separate hypertext transfer connection; and
receive another hypertext transfer protocol request including at least one other proposed transport method comprising a websocket, when the first transport method comprising the separate hypertext transfer connection is not accepted for establishment or not successfully established.

10. A non-transitory computer-readable medium including program code which when executed causes operations comprising:
sending, by a client, a hypertext transfer protocol request for at least one asynchronous notification to be sent by a server to the client, the hypertext transfer protocol request including at least one proposed transport method for carrying the at least one asynchronous notification, the at least one proposed transport method comprising a first transport method, the first transport method comprising a separate hypertext transfer connection, the first transport method comprising a separate hypertext transfer connection, the hypertext transfer protocol request including a callback uniform resource identifier at the client to enable the separate hypertext transfer connection, the separate hypertext transfer connection comprising a reverse hypertext transport protocol callback to the client;

determining, by the client, whether the first transport method comprising the separate hypertext transfer connection is successfully established, the first transport method being selected by the server from the at least one proposed transport method included in the hypertext transfer protocol request; and when the determination is that the first transport method comprising the separate hypertext transfer connection is not established successfully, sending, by the client, another hypertext transfer protocol request to the server, the other hypertext transfer protocol request including at least one other proposed transport method comprising a websocket.

11. A non-transitory computer-readable medium including program code which when executed causes operations comprising:

receiving, by a server, a hypertext transfer protocol request for the server to send at least one asynchronous notification, the hypertext transfer protocol request including at least one proposed transport method for carrying the at least one asynchronous notification, the at least one proposed transport method comprising a first transport method, the first transport method comprising a separate hypertext transfer connection, the hypertext transfer protocol request including a callback uniform resource identifier at the client to enable the separate hypertext transfer connection, the separate hypertext transfer connection comprising a reverse hypertext transport protocol callback to the client;

sending, by the server, an indication of whether the first transport method comprising the separate hypertext transfer connection selected by the server from the at least one proposed transport method is accepted for establishment;

sending, by the server, a message to probe establishment of the first transport method comprising the separate hypertext transfer connection; and receiving, by the server, another hypertext transfer protocol request including at least one other proposed transport method comprising a websocket, when the first transport method comprising the separate hypertext transfer connection is not accepted for establishment or not successfully established.

12. The apparatus of claim 8, wherein the first transport method is determined to be successfully established in response to receiving, from the server, a message to probe establishment of the first transport method.

* * * * *